United States Patent
Lin et al.

(10) Patent No.: US 8,659,863 B2
(45) Date of Patent: Feb. 25, 2014

(54) CIRCUIT PROTECTION DEVICE AND PROTECTION METHOD THEREOF

(75) Inventors: Hou Yuan Lin, Taipei Hsien (TW); Chen Shun Chen, Taipei Hsien (TW); Tse Hsine Liao, Taipei Hsien (TW); Kuei Min Chen, Taipei Hsien (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 100 days.

(21) Appl. No.: 13/329,312

(22) Filed: Dec. 18, 2011

(65) Prior Publication Data
US 2013/0027826 A1    Jan. 31, 2013

(30) Foreign Application Priority Data
Jul. 27, 2011    (TW) .............................. 100126521 A

(51) Int. Cl.
*H02H 3/00*    (2006.01)
(52) U.S. Cl.
USPC ............................................. 361/85; 361/87

(58) Field of Classification Search
USPC ....................................................... 361/85, 87
See application file for complete search history.

(56) References Cited

U.S. PATENT DOCUMENTS

| | | | |
|---|---|---|---|
| 2002/0039269 A1* | 4/2002 | Kumagai et al. | 361/93.1 |
| 2009/0273498 A1* | 11/2009 | Goder et al. | 341/141 |
| 2010/0320971 A1* | 12/2010 | Zhu et al. | 320/134 |

* cited by examiner

*Primary Examiner* — Scott Bauer
(74) *Attorney, Agent, or Firm* — Chun-Ming Shih

(57) ABSTRACT

A circuit protection device and a protection method thereof are provided. The circuit protection device includes a pulse width modulation unit which detects in order for a plurality of current phase of a plurality of transistors. The pulse width modulation unit decides the current phase of the transistors override a first threshold value whether. Then, the pulse width modulation unit sends a control signal to close the transistor that the current phase exceeds the first threshold value, so as to avoid the transistor burn down.

3 Claims, 7 Drawing Sheets

CIRCUIT PROTECTION DEVICE AND PROTECTION METHOD THEREOF

This application claims the benefit of the filing date of Taiwan Patent Application No. 100126521, filed on 27 Jul. 2011, in the Taiwan Intellectual Property Office, the disclosure of which is incorporated herein in its entirety by reference.

BACKGROUND OF THE INVENTION

1. Field of Invention

The present invention discloses a circuit protection device and a protection method, in particular, relates to a circuit protection device and a protection method that prevent the transistor from burning down.

2. Related Art

The electrical products prevail in nowadays with the progress in techniques, and most of them are necessary for the daily life, for example, computers, mobile phone or digital players. Many electrical products possess the circuit board with many electrical components, such as processors, transistors, Pulse Width Modulation (PWM) units, capacitance and the like.

The operation speed of the electrical product increases as the growing requirement. As a result, the temperature of the electrical component increases while higher driving current is required to keep up the speed. For example, a processor, and a transistor which controls power supply, wherein the transistor provides more current to support the processor processing large amount data, such that the temperatures of the processor and the transistor increase.

Though the promotion of the operation speed of the electrical product increases the temperature of the electrical component, the electrical component, such as processors, transistors, Pulse Width Modulation (PWM) units, capacitance and the like, is not going to overheat or burn down under the normal operation condition.

FIG. 1 illustrates a circuit board of the prior art. As in FIG. 1, the circuit board 100 includes a processor 110, a plurality of transistor 120, and a Pulse Width Modulation (PWM) unit 130. The PWM unit 130 detects the current of the transistor 120 to measure the current that the transistor 120 provides for the processor 110. The processor 110, the transistor 120, the PWM unit 130, or other similar electronic component may burn down by the excessive current that results from the aged component, abnormal condition or external effect such as Electromagnetic interference (EMI), Electro-Static discharge (ESD), and so on.

If the PWM unit 130 or the transistor 120 becomes abnormal, the current or the temperature of the PWM unit 130 or the transistor 120 overruns and leads the malfunction of the PWM unit 130 or the transistor 120. Without any protection mechanism, the electronic component easily burns down or breaks, furthermore, affects the other apparatus.

SUMMARY OF THE INVENTION

Accordingly, the present invention provides a circuit protection device and a circuit protection method to solve the aforesaid problems. The circuit protection device and the circuit protection method could keep the transistor from excessive current and overhigh temperature, such that prevent the PWM unit, the transistor or the processor from burning down then solve the problems of the prior art.

The circuit protection device is applicable to a circuit board and a plurality of transistors are electrically disposed on the circuit board. The circuit protection device includes a Pulse Width Modulation (PWM) unit electrically connecting to the plurality of transistors, and the PWM unit stores a plurality of first threshold values. Each transistor has a current phase and corresponds to the first threshold value. The PWM unit sequentially detects the current phase of each transistor and determines whether the current phase of each transistor exceeds the corresponding first threshold value. Accordingly, the PWM unit produces a control signal to shut down the transistor when the current phase exceeds the corresponding first threshold value.

The circuit protection method includes the following steps. First, the PWM unit detects a plurality of current phases of a plurality of the plurality of transistors. And the PWM unit determines whether the current phase of each transistor exceeds the corresponding first threshold value, then the PWM unit produces a control signal to shut down the transistor when the current phase exceeds the corresponding first threshold value.

The features of present invention are to detect the current phase of a transistor and simultaneously judge whether the current phase of each transistor is normal or not. If the current phase is abnormal, the PWM unit shuts down the abnormal transistor. The present invention avoids the excessive current or the overhigh temperature, and as a consequence prevents the PWM unit, the transistor or the processor from burning down.

Further objects, embodiments and advantages are apparent in the drawings and in the detailed description which follows.

DETAIL DESCRIPTION OF THE INVENTION

Figure 1:
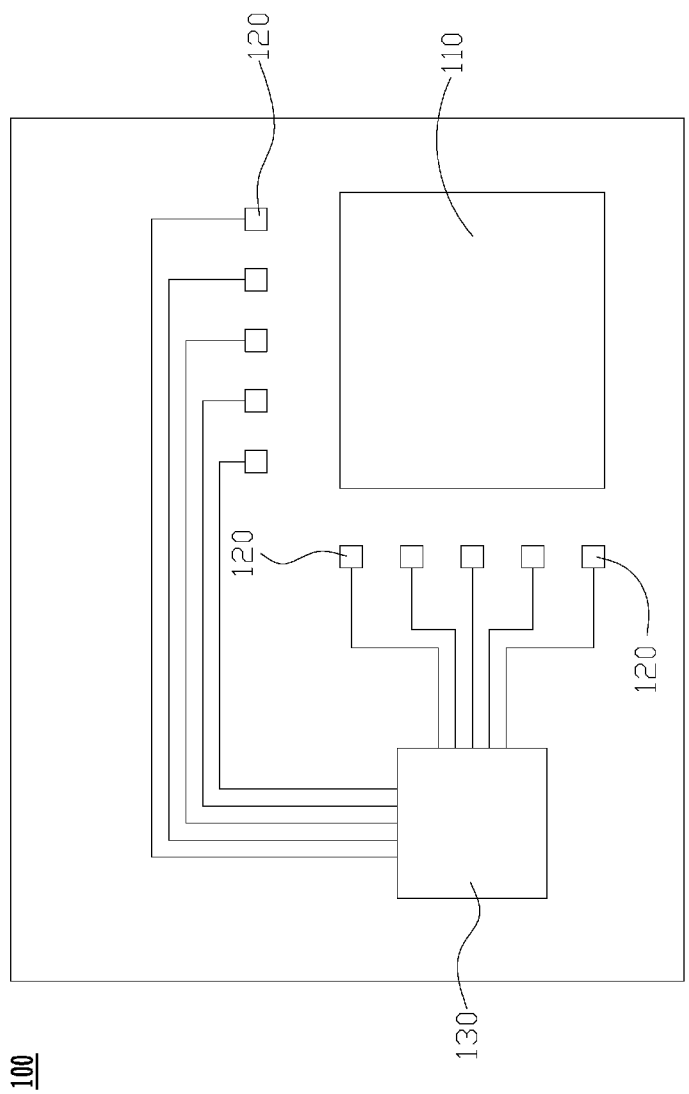
FIG. 1 illustrates the block chart of a circuit board of the prior art.
Figure 2:
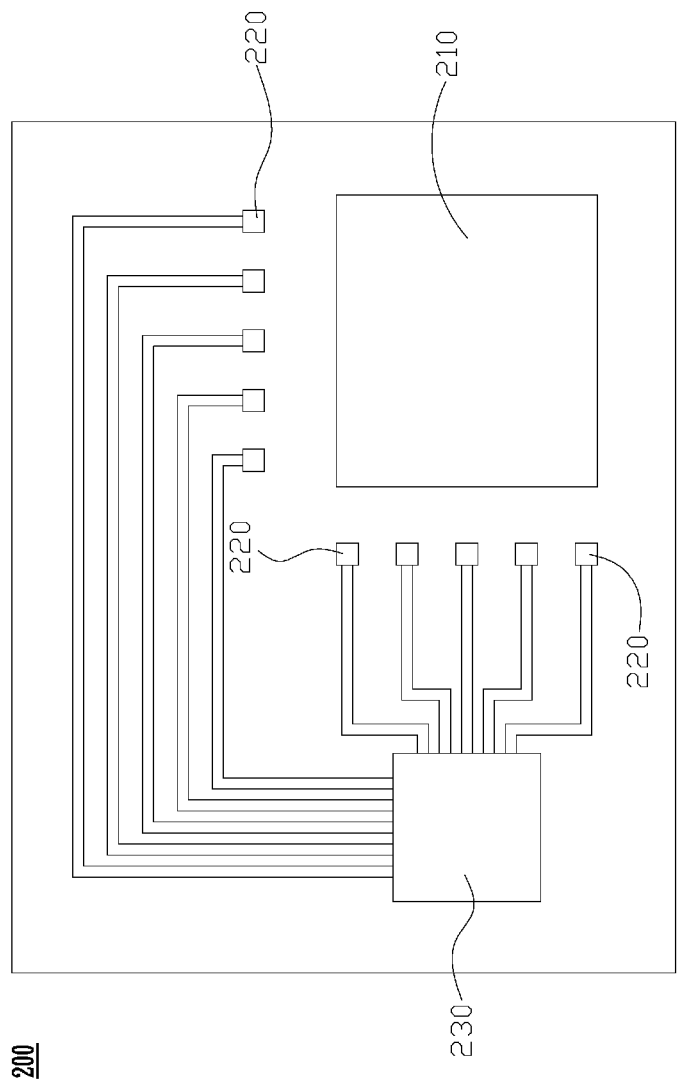
FIG. 2 illustrates the block chart of a circuit protection device of the first embodiment of the present invention.

FIG. 2 illustrates the block chart of a circuit protection device of the first embodiment of the present invention. The circuit protection device of the present invention is applicable to a circuit board 200 where a processor 210 and a plurality of transistors 220 are disposed, therefore the transistor 220 provides the current for the processor 210.

The circuit protection device of the present invention includes a Pulse Width Modulation (PWM) unit 230 electrically connecting to the plurality of transistors 220. Each transistor 220 has a current phase.

The PWM unit 230 stores a plurality of first threshold values, and each first threshold value corresponds to the transistor 220 respectively. The PWM unit 230 detects the current phase of each transistor 220 in order and judges whether the current phase of each transistor 220 exceeds the corresponding first threshold value or not. If the current phase exceeds the corresponding first threshold value, the PWM unit 230 produces a control signal to shut down the transistor 220 when the current phase exceeds the corresponding first threshold value.

The PWM unit 230 electrically connects to every transistor 220 via a plurality of connect lines. The PWM unit 230 not only detects the current phase of the transistor 220 but also turns the transistor 220 on or off.

The PWM unit 230 of the present invention determines whether the current phase of each transistor 220 is normal or not first, and then shuts down the abnormal transistor 220. The operation avoids the excessive current or the overhigh temperature of the transistor 220, such that prevents the PWM unit 230, the transistor 220 or the processor 210 from burning down.

Figure 3:
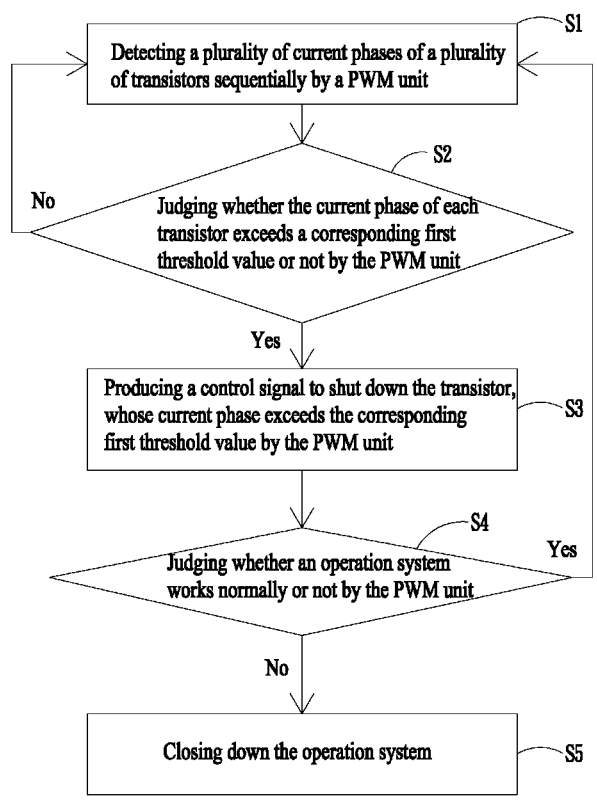
FIG. 3 illustrates the flow chart of a circuit protection method of the first embodiment of the present invention.

FIG. 3 illustrates the flow chart of a circuit protection method of the first embodiment of the present invention. The circuit protection method of the present invention includes the following steps. Step S1 describes the process that a PWM unit 230 detects a plurality of current phases of a plurality of transistors 220 sequentially. Step S2 describes the process that the PWM unit 230 determines whether the current phase of each transistor 220 exceeds the corresponding first threshold value or not. If the current phase does not exceed the corresponding first threshold value, then step S1 repeats.

If the current phase of each transistor 220 exceeds the corresponding first threshold value in step S2, step S3 follows step S2. Step S3 describes the process that the PWM unit 230 produces a control signal to shut down the transistor 220 when the current phase exceeds the corresponding first threshold value. The operation of step S3 avoids the excessive current or the overhigh temperature of the transistor 220 such that prevents the PWM unit 230, the transistor 220 or the processor 210 from burning down.

In order to avoid the unusual operation of the circuit board 200, furthermore, to avoid the abnormal operation of the apparatus that utilizes the circuit board 200, and to avoid the abnormal operation of the operation system of the apparatus then step S4 executes after shutting down the abnormal transistor 220. Step S4 describes the process that the PWM unit 230 judges whether an operation system works normally or not.

If the PWM unit 230 deems that the operation system works normally, step S1 repeats; otherwise, step S5 follows step S4. Step S5 describes the process that the operation system closes down to inform the user that the circuit board 200 is out of the order and the operation system must close down for repairing.

Figure 4:
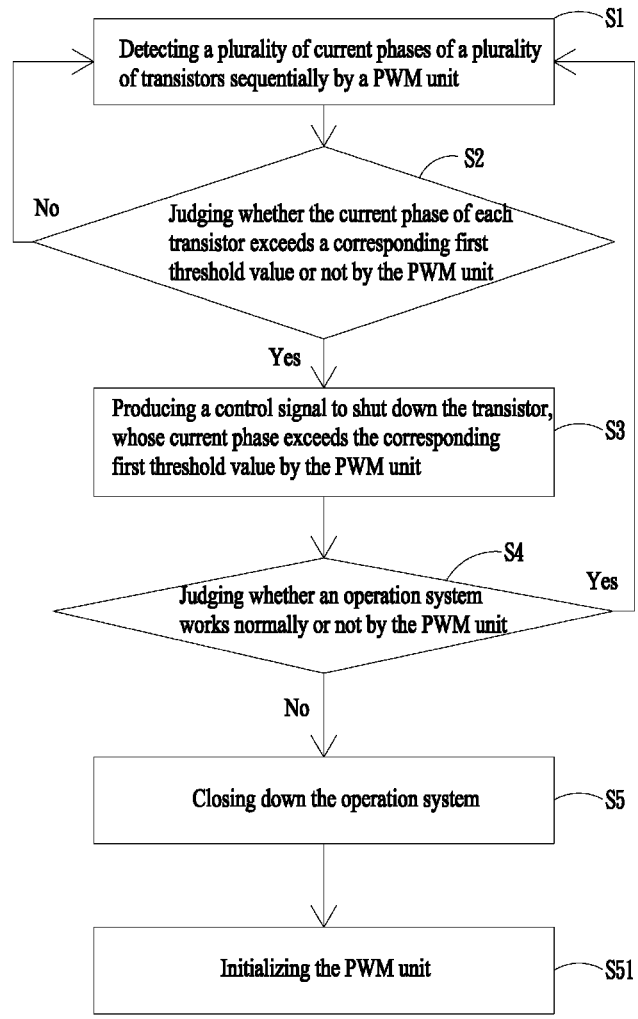
FIG. 4 illustrates the flow chart of a circuit protection method of the second embodiment of the present invention.

FIG. 4 illustrates the flow chart of a circuit protection method of the second embodiment of the present invention. For the purpose to prevent the transistor 220 from being deemed as abnormal and being shut down because of the short interference of the external effects, such as Electromagnetic interference (EMI) or Electro-Static discharge (ESD), step S51 follows after shutting down the operation system. Step S51 describes the process that the PWM unit 230 initializes.

By this way, the PWM unit 230 detects all current phases of the plurality of transistors 220 anew while user reboots the operation system. The PWM unit 230 initializes to return the normal operation.

In addition, after step S4, if the operation system works normally, step S1 follows step S4; otherwise, the operation system closes down.

The PWM unit 230 of the present embodiment examines a plurality of transistors 220 repeatedly and detects each current phase again to make sure whether any abnormal transistor 220 works, then the PWM unit 230 closes down the abnormal transistor 220. The PWM unit 230 further determines whether the operation system works normally; if the operation system works normally, step S1 follows; otherwise, the operation system closes down for repairing operation.

Furthermore, as the step described in FIG. 4, step S51 comes after step S5. Step S51 describes the process that the PWM unit 230 initializes. The PWM unit 230 detects all current phases of the plurality of transistors 220 anew while user reboots the operation system. The PWM unit 230 initializes to return the normal operation.

Figure 5:
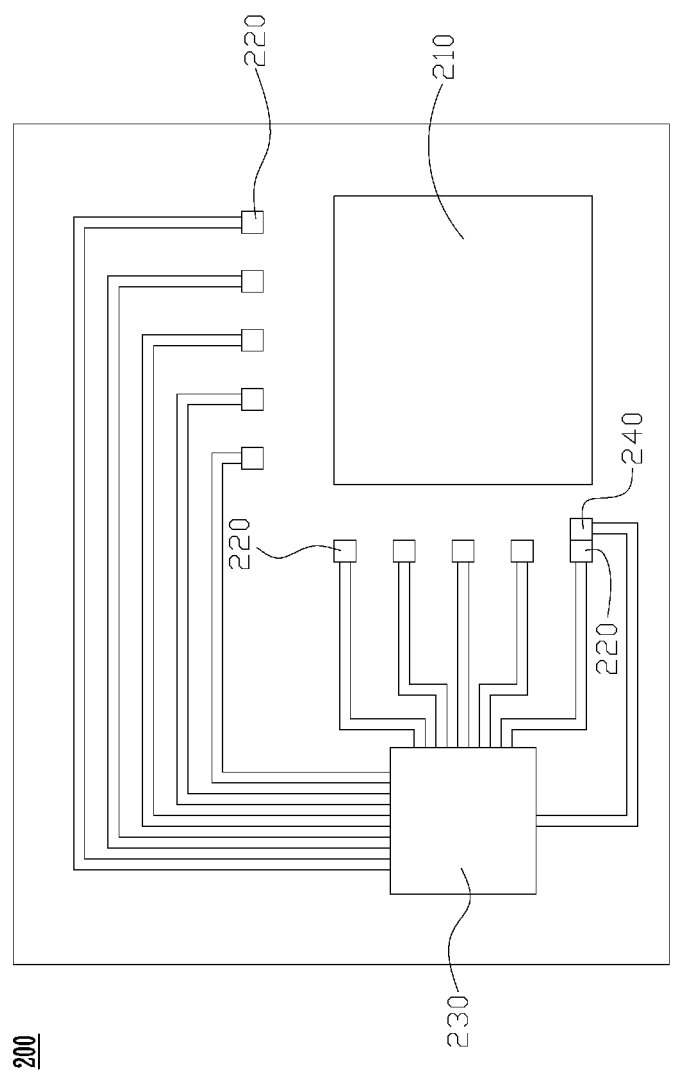
FIG. 5 illustrates the block chart of the structure of a circuit protection device of the third embodiment of the present invention.

FIG. 5 illustrates the block chart of the structure of a circuit protection device of the third embodiment of the present invention. The present embodiment features, differentiating from the former embodiment, the design further comprising a temperature sensor 240 to detect the temperature of the transistor 220. The temperature sensor 240 of the present embodiment could be a thermal resistor, but the temperature sensor 240 is not limited to that described therein.

The temperature sensor 240 electrically connects to the PWM unit 230 which stores a plurality of second threshold values. Each second threshold value corresponds to the various transistors 220 respectively.

The PWM unit 230 of the present embodiment receives the temperature information from the temperature sensor 240 and judges whether the temperature of each transistor 220 exceeds the corresponding second threshold value or not. If the temperature of the transistor 220 exceeds the corresponding second threshold value, the transistor 220 is overheated, and then the PWM unit 230 produces a control signal to shut down the transistor 220 when the temperature exceeds the corresponding second threshold value. There is one temperature sensor 240 of the present embodiment for exemplary description, but the quantity of the temperature sensor 240 is not limited to that described therein. User could decide the quantity of the temperature sensor 240 according to various actual designs.

Figure 6:
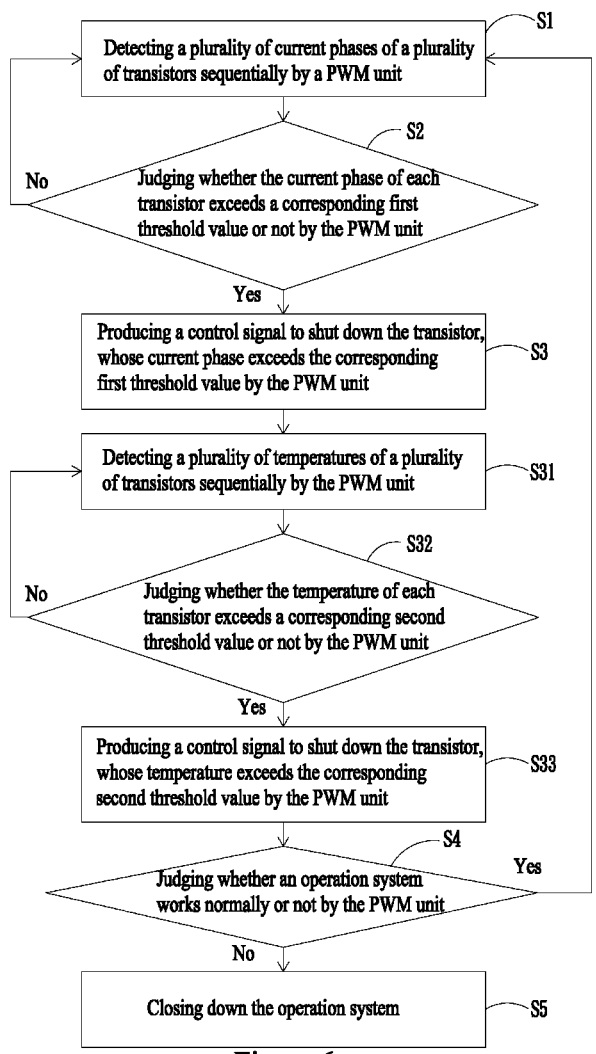
FIG. 6 illustrates the flow chart of a circuit protection method of the third embodiment of the present invention.

FIG. 6 illustrates the flow chart of a circuit protection method of the third embodiment of the present invention. In order to promote the protection efficiency of the transistor 220, processor 210 and the like, the method of the present embodiment further includes the following steps S31, S32 and S33.

The PWM unit 230 detects the temperature after shutting down the transistor when the current phase is abnormal. Consequently, step S31 follows step S3. Step S31 describes the process that the PWM unit 230 detects a plurality of temperature of a plurality of transistor 220 by receiving the temperature information form the temperature sensor 240. Step S32 follows step S31, and step S32 describes the process that the PWM unit 230 judges whether the temperature of each transistor 220 exceeds the corresponding second threshold value or not. Step S33 follows step S32, and step S33 describes the process that the PWM unit 230 produces a control signal to shut down the transistor 220 when the temperature exceeds the corresponding second threshold value.

The judgment of the current phase and the temperature avoid the excessive current or the overhigh temperature of the transistor 220, such that prevent the PWM unit 230, the transistor 220 or the processor 210 from burning down.

Figure 7:
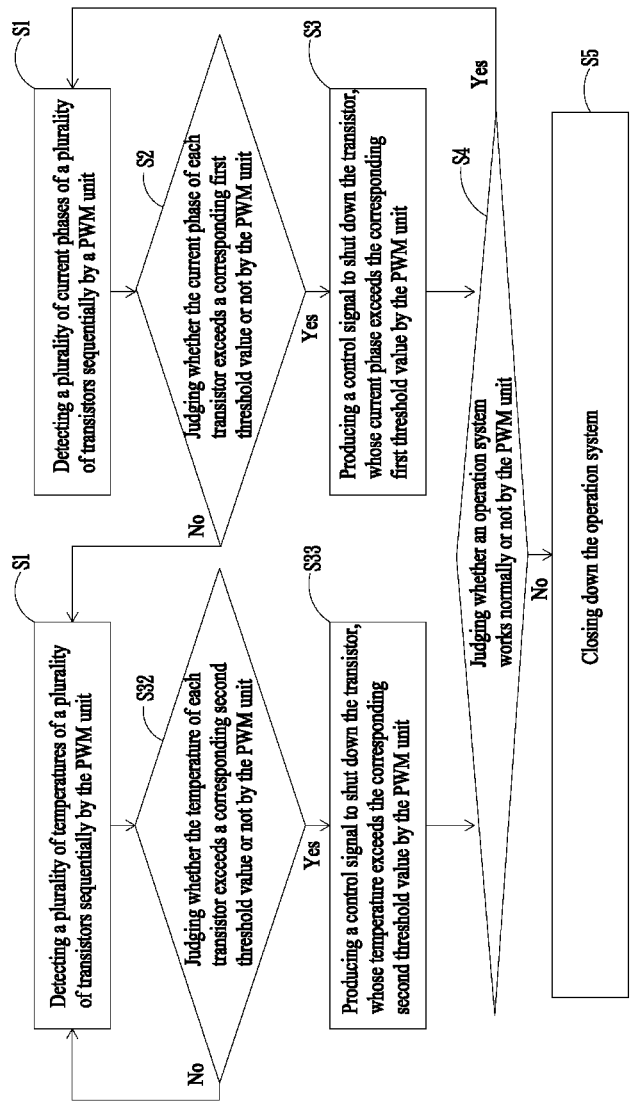
FIG. 7 illustrates the flow chart of a circuit protection method of the fourth embodiment of the present invention.

FIG. 7 illustrates the flow chart of a circuit protection method of the fourth embodiment of the present invention. The present embodiment features, differentiating from the former embodiments, the design with different sequence of step S31, S32 and S33.

The third embodiment closes down the abnormal transistor 220 first and then detects the temperature of the transistor 220. The present embodiment detects the temperature while the current phase of the transistor 220 is normal. If the current phase of the transistor 220 does not exceed the corresponding first threshold value in step S2, step S31 follows. Consequently, step S32 and step S33 follow step S31 sequentially.

Moreover, in the present embodiment, step S4 follows step S3 and step S33, then step S5 follows step S4. So the step of detecting the temperature of the transistor 220 could precede or succeed the step of monitoring the current phase. Furthermore, the step of detecting the temperature of the transistor 220 could succeed the step of shutting down the abnormal transistor 220. User could regulate the sequence of the steps according to the various requirements.

To sum up, the circuit protection device and the circuit protection method of the present invention are implemented by a PWM unit. The PWM unit detects a plurality of current phases of a plurality of transistors sequentially, further, the PWM unit determines whether the current phase exceeds the corresponding first threshold value or not, and the PWM unit produces a control signal to shut down the transistor 220 when the current phase exceeds the corresponding first threshold value. The present invention avoids the excessive current or the overhigh temperature of the transistor 220, such that prevents the PWM unit 230, the transistor 220 or the processor 210 from burning down.

While the disclosure has been described in terms of what is presently consider to be the preferred embodiments, it is to be understood that the disclosure needs not be limited to the disclosed embodiment. On the contrary, it is intended cover various modifications and similar arrangements included within the spirit and scope of the appended claims which are to be accorded with the broadest interpretation so as to encompass all such modification and similar structures. It is therefore intended by the appended claims to define the true scope of the invention.

What is claimed is:

1. A circuit protection method comprising the following steps:

detecting a current phase of a plurality of transistors in order by a PWM unit;

determining whether the current phase of each transistor exceeds a corresponding first threshold value by the PWM unit;

producing a control signal by the PWM unit to shut down the transistor when the current phase thereof exceeds the corresponding first threshold value; and determining whether an operation system works normally after the step of producing the control signal by the PWM unit to shut down the transistor when the current value thereof exceeds the corresponding first threshold value, if not, shutting down the operation system, and further initializing the PWM unit after the step of shutting down the operation system.

2. The circuit protection method as claim 1, after the step of determining whether the current phase of each transistor exceeds a corresponding first threshold value by the PWM unit; if not, detecting a current phases of a plurality of transistors in order by the PWM unit; otherwise, producing a control signal by the PWM unit to shut down the transistor when the current phase exceeds the corresponding first threshold value.

3. The circuit protection method as claim 1 further comprising the following step:

detecting a temperatures of a plurality of transistors in order by a PWM unit;

determining whether the temperature of each transistor exceeds a corresponding second threshold value by the PWM unit; and producing a control signal by the PWM unit to shut down the transistor when the temperature thereof exceeds the corresponding second threshold value.

* * * * *